(12) United States Patent
Kim et al.

(10) Patent No.: US 8,633,867 B2
(45) Date of Patent: Jan. 21, 2014

(54) MOBILE TERMINAL HAVING DETACHABLE SUB-DISPLAY UNIT

(75) Inventors: Yu Guen Kim, Gyeonggi-do (KR); Sang Min Hyun, Seoul (KR); Seog Guen Kim, Seoul (KR); Yun Su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 12/705,735

(22) Filed: Feb. 15, 2010

(65) Prior Publication Data

US 2010/0207903 A1  Aug. 19, 2010

(30) Foreign Application Priority Data

Feb. 18, 2009 (KR) .................. 10-2009-0013320

(51) Int. Cl.
*G09G 5/00* (2006.01)
(52) U.S. Cl.
USPC ........................................... 345/1.1; 345/1.2

(58) Field of Classification Search
USPC .............. 345/168, 173, 1.1, 2.1–2.3, 3.1, 1.2
See application file for complete search history.

(56) References Cited

U.S. PATENT DOCUMENTS

2003/0203747 A1* 10/2003 Nagamine .................. 455/575.3
2006/0124897 A1*  6/2006 Shingai et al. ........... 252/299.01

* cited by examiner

*Primary Examiner* — Ricardo L Osorio
(74) *Attorney, Agent, or Firm* — H.C. Park & Associates, PLC

(57) ABSTRACT

The present invention relates to a mobile terminal having a detachable sub-display unit. A mobile terminal having a detachable sub-display unit includes a first body unit having a first display unit to a front surface of the first body unit. The invention also includes a second body unit having a second display unit to a front surface of the second body unit, wherein a magnet is formed on at least a portion of one side surface of the first body unit and at least a portion of one side surface of the second body unit, and the second body unit can be detachably coupled to the at least one side surface of the first body unit by the magnet.

18 Claims, 10 Drawing Sheets

MOBILE TERMINAL HAVING DETACHABLE SUB-DISPLAY UNIT

CROSS REFERENCE TO RELATED APPLICATION

This application claims priority from and the benefit of Korean Application No. 10-2009-0013320, filed on Feb. 18, 2009, which is hereby incorporated by reference for all purposes as if fully set forth herein.

BACKGROUND OF THE INVENTION

1. Field of the Invention

Exemplary embodiments of the present invention relate to a mobile terminal, and more particularly, to a mobile terminal having a detachable sub-display unit.

2. Description of the Background

A mobile terminal is an electronic device which provides users with convenience of mobility along with a rich set of services and features. This convenience has spawned various is mobile terminals to develop effectively executable functions such as writing documents and playing games.

To promote greater adoption, manufacturers of a mobile terminal effort to develop various executable functions such as digital photography, reception of digital broadcast, playing moving images and Internet web browsing for various services and features in addition to a voice communication function. To address these requirements, a trend exists that a display unit of a mobile terminal is increasing in size to display a status and a menu and conveniently execute such functions by a user.

However, a typical display unit of the mobile terminal has limited visual portion for using an Internet web browsing function because an insufficient size of a display area of the display unit and not changeable of the size of the display. One area of effort involves a folder unit having an additional display unit that may be rotatably coupled to a body unit of a mobile terminal. However, this approach bears a disadvantage that a second display unit of a folder type is coupled, the size of the mobile terminal becomes larger and convenience of portability of the mobile terminal is reduced.

Therefore, there is a need for an approach for providing a mobile terminal that may support an Internet web browsing function through a wide display area while enhancing the mobility of the mobile terminal.

SUMMARY OF THE INVENTION

These and other needs are addressed by the present invention, in which exemplary embodiments of the present invention provide a mobile terminal capable of expanding a display screen area and enhancing mobility of the mobile terminal by coupling a second body unit is having a second display unit to a first body unit having a first display unit by user configuration.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a method for expanding a display screen. The method includes receiving a request from a first display unit to expand a display image. The method also includes determining a second display to satisfy the expand request. The method includes outputting whole or in part of the display image using the second display. The first display and the second display are detachably coupled using a magnet.

Exemplary embodiments of the present invention disclose a mobile terminal having a detachable sub-display unit. The terminal includes a first body unit having a first display unit formed to a portion of the first body unit. The terminal also includes a second body unit having a second display unit formed to a portion of the second body unit. A magnet is formed to a portion of side surface of the first body unit and a portion of side surface of the second body unit, and the second body unit is detachably coupled to the first body unit.

It is to be understood that both the foregoing general description and the is following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

An apparatus, method, and software for control of a mobile terminal having detachable sub-display unit are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although exemplary embodiments of the present are discussed with respect of a mobile communication terminal system, it is recognized by one of ordinary skill in the art that the embodiments of the present invention have applicability to any type of communication system, for example, a mobile communication terminal, a mobile phone, a personal digital assistant, a smart phone, an IMT 2000 (International Mobile Telecommunication 2000) terminal, a CDMA (Code Division Multiple Access) terminal, a WCDMA (Wideband Code Division Multiple Access) terminal, a GSM (Global System for Mobile Communication) terminal, a GPRS (General Packet Radio Service) terminal, an EDGE (Enhanced Data GSM Environment) terminal, an UMTS (Universal Mobile Telecommunication Service) terminal, a digital broadcasting terminal and a multimedia device.

Figure 1:
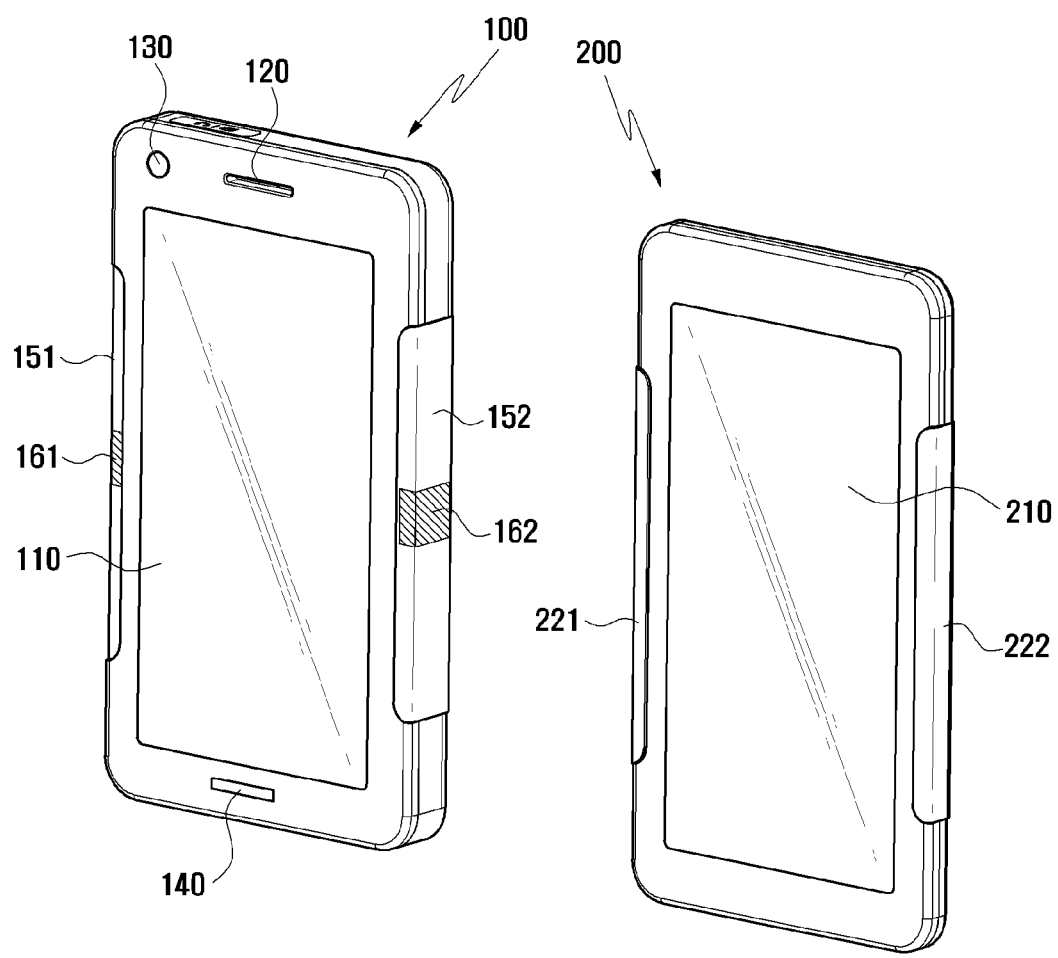
FIG. 1 is an exemplary view illustrating a configuration of a mobile terminal having a detachable sub-display unit, according to exemplary embodiments of the present invention.

FIG. 1 is an exemplary view illustrating a configuration of a mobile terminal having a detachable sub-display unit, according to an exemplary embodiment of the present is invention.

As shown in FIG. 1, a mobile terminal capable of supporting a detachable sub-display unit may include a first body unit 100 having a first display unit 110, and a second body unit 200 having a second display unit 210.

The first body unit 100 may include following functional components, for example, a first display unit 110, a sound output unit 120, a camera unit 130 and a sound input unit 140. The first body unit 100 may include a main display capable of performing a main display function of the mobile terminal, and may be operated as a stand-alone main terminal.

The first display unit 110 can be installed to a portion of the front surface of the first body unit 100. The first display unit 110 may display a desired screen image to a user, and may operate as a user interface by which the user can input a command. The first display unit 110 may utilize an LCD (liquid crystal display), an OLED (organic light emitting diode), a TFT (thin film transistor), an electrophoretic, or an LITI (laser induced thermal image) technology. The LCD can be a digital display that uses liquid crystal cells which change reflectivity in an applied electric field and be operated by controlling the opacity of segments by varying the electrical signal. The OLED, a self-illuminating diode that glows when an electrical field is applied to the electrode that may not require backlighting or diffusers. By way of example, the first display unit 110 may have a touch screen function applicability by which the user may input a command.

A key input unit (not shown) may be formed to the front surface or a side surface of the first body unit 100. A user may input a command using the key input unit. The key input unit may include function keys by which the user can input various commands. The key input unit may be provided in a form of a key pad or a key button.

By way of configuration, the first body unit 100 may include a sound output unit 120 formed at an upper portion of the front surface of the first body unit 100 to output a sound signal, and the sound input unit 140 formed at a lower portion of the front surface of the first body unit 100 to input a sound signal. The user may hold the sound output unit 120 near an ear to receive a sound signal from a communication party and may hold the sound input unit 140 near the mouth to transmit a sound signal to the communication party. In addition, for example, the first body unit 100 may have the camera unit 130 formed at a upper portion of the front surface of the first body unit 100 to photograph an object to perform visual communication.

The second body unit 200 may include the second display unit 210 on a front surface thereof. The second body unit 200 may have a sub-display unit that can be used to expand a display screen area of the mobile terminal, and may perform as a sub-terminal that can be detachable from the first body unit 100. The second display unit 210 may adopt a similar technology utilized for the first display unit 110, such as an LCD or an OLED technology, and may have a touch screen function. The second body unit 200 may provide a key input unit (not shown) formed on a front surface or side surface of the second body unit 200.

A detachable sub-display unit according to exemplary embodiments of the present invention may have a magnet which is provided at a portion of one of the side surface of the first body unit 100 (hereafter a "first side surface") and a magnet provided at a portion of one of the side surface of the second body unit 200 (hereafter a "second side surface"). In this example, the second body unit 200 may be attached to a portion of the first side surface of the first body unit 100 using the magnet. As such, the second body unit may be separated from the first body unit 100. In FIG. 1, magnets 151 and 152 can be formed to a portion of the each side surfaces of the first body unit 100, and magnets 221 and 222 can be formed to a portion of the each side surfaces is of the second body unit 200. In some examples, a magnet may be formed on only one side surface of the first body unit 100 and one side surface of the second body unit 200. It is contemplated that a mounting location and quantity of the magnets is not limited thereto, and it is recognized by one of ordinary skill in the art that the embodiments of the present invention have applicability to any type of magnets may be formed on an upper end and a lower end of the first body unit 100 and of the second body unit 200, as will be more fully described later with respect to FIG. 6.

According to exemplary embodiments of the present invention, the mobile terminal having a detachable sub-display unit may couple the first body unit 100 and second body unit 200 through the magnets 151, 152, 221, and 222, thereby enables to simply a coupling structure of the mobile terminal compared to a coupling structure utilized in a folder type mobile terminal, typically using a mechanical coupling structure.

The first body unit 100 may include sensor units 161 and 162 provided to detect whether the second body unit 200 is coupled to the first body unit 100. In some examples, the sensor units 161 and 162 may be formed at a portion of a side surface of the first body unit 100 and/or the second body unit 200 at which the first body unit 100 and the second body unit 200 can be coupled. By way of example, the sensor units 161 and 162 can be formed to the magnets 151 and 152, respectively, installed on each side surfaces of the first body unit 100 in FIG. 1. It is contemplated that the present invention is not limited thereto. The sensor units 161 and 162 may be provided to output signals to detect whether the second body unit 200 is coupled to the first body unit 100 and to transmit the output signals to a first control unit 180, as will be described later in detail.

As shown in FIG. 1, the first body unit 100 and second body unit 200 may have a is a bar type structure for providing a touch screen of the first display unit 110 and second display unit 210, respectively. It is contemplated that a shape of a main terminal is not limited thereto, and the present invention may be applied to adopting various types of a mobile terminal, such as a slide type, a flip type, a folder type, and a rotating type.

Although not shown in FIG. 1, a first electronic circuit module and a second electronic circuit module (not shown) may be installed inside the first body unit 100 and second body unit 200. By way of example, the first electronic circuit module and second electronic circuit module may be provided as a thin plate including circuits that can be used to mechanically support and electrically connect the first electronic circuit board and second electronic circuit board and electronic components using conductive pathways. Preferably, the electronic circuit board has a printed circuit board (PCB). The first display unit 110 of the first body unit 100 and second display unit 210 of the second body unit 200 can be provided to receive electric signals from the first electronic circuit module and second electronic circuit module, to output various information of the mobile terminal, and to receive a command input by the user.

The first electronic circuit module and second electronic circuit module may be embodied with a various software modules to control operations of the mobile terminal. The software module may include a control system to control display functions of the first display unit 110 and second display unit 210.

Figure 2:
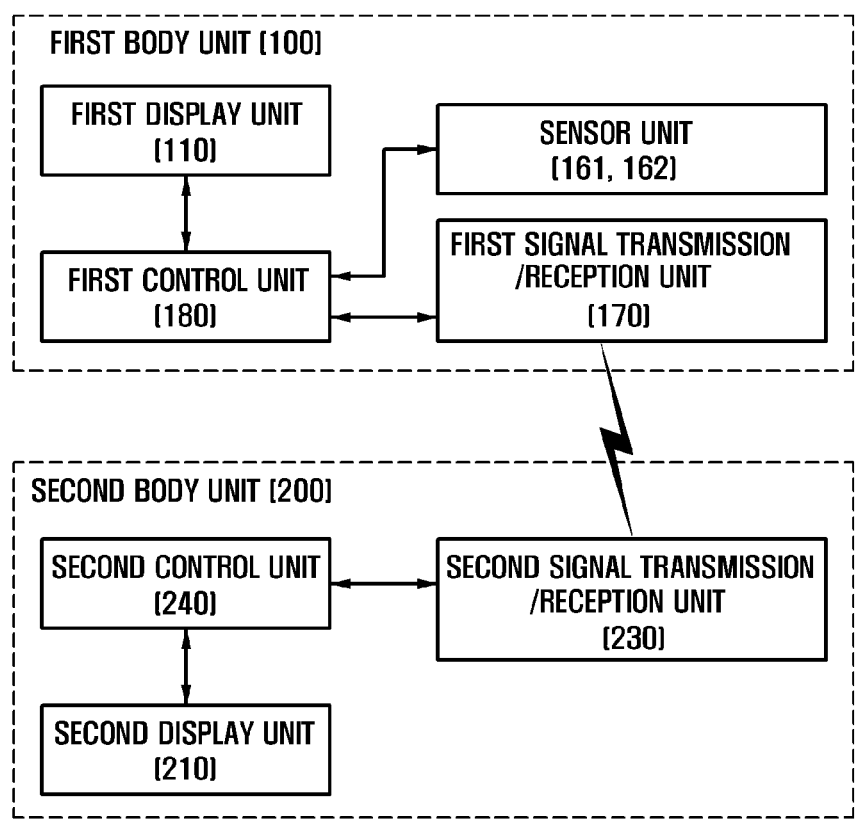
FIG. 2 is an exemplary block diagram of a control system of a mobile terminal capable of supporting a detachable sub-display unit that can be used to implement various embodiments of the present invention.

FIG. 2 is an exemplary block diagram of a control system of a mobile terminal capable of supporting a detachable sub-display unit that can be used to implement various embodiments of the present invention.

As shown in FIG. 2, the first body unit 100 may include a first control unit 180 to is control a screen display of the first display unit 110, and the second body unit 200 includes a second control unit 240 to control a screen display of the second display unit 210. The first control unit 180 and second control unit 240 may control screen displays of the first display unit 110 and second display unit 210, respectively, according to an operation condition of the first body unit 100 and second body unit 200. In this example, a user can operate only the first body unit 100 or operate the first body unit 100 and second body unit 200 together.

The first control unit 180 may receive an input command by the user from the first display unit 110 and may receive a signal output transmitted from the sensor units 161 and 162, and may control the screen display of the first display unit 110. When the user operates the first body unit 100 and second body unit 200 together, the first control unit 180 may output a control signal to the second control unit 240 to control the screen display of the second display unit 210. The second control unit 240 may receive an input command by the user from the second display unit 210 and may receive a control signal transmitted from the first control unit 180, and may control the screen display of the second display unit 210. The second control unit 240 may output a control signal to the first control unit 180 to control the screen display of the first display unit 110 according to an input command by the user via the second display unit 210.

The first body unit 100 may include a first signal transmission/reception unit 170 and the second body unit 200 may include a second signal transmission/reception unit 230. The first control unit 180 and second control unit 240 may transmit and receive control signals to and from each other via the first signal transmission/reception unit 170 and second signal transmission/reception unit 230 to control the screen displays of the first display unit 110 and second display unit 210, respectively. In some examples, the first signal transmission/reception unit 170 and the second signal transmission/reception unit 230 may transmit and receive control is signals using wireless communication. Various short range wireless communication technologies, such as a Bluetooth, an IrDA (Infrared Data Association), a Zigbee, and an UWB (Ultra Wideband), may be used for a communication protocol between the first signal transmission/reception unit 170 and second signal transmission/reception unit 230. In some examples, Bluetooth technology may be a wireless communication technology based on a short range radio technology that can operate at a frequency of around 2.4 GHz and can transmit data at a speed of maximum of 1 Mbps within a radius of 10 meters, and has an advantage that electric power consumption of a Bluetooth module is very low (approximately 100 mW).

A control system, as shown in FIG. 2, may include a bus (not shown) or other communication mechanisms for communicating data, and control units 180 and 240 including a processor (not shown) coupled to the bus for processing information. The electronic device may also include memory unit (not shown), which may be a random access memory (RAM) or a dynamic storage device coupled to the bus for storing information and instructions to be executed by the processor. The memory unit may also be used for storing temporary variables or intermediate information during execution of instructions by the processor. The memory unit may be a read only memory (ROM) or other static storage device coupled to the bus for storing static information and instructions for the processor. The memory unit may include a series of applications to operate the electronic device. Examples of suitable applications include a touch application, a pressure application, an image application, and a direction application.

The display unit 110 and 240, including display units 110 and 210, may be coupled to sensor unit 161 and 162. Examples of the display unit 120 include, for example, a liquid crystal display, a flexible display, or active matrix display, for displaying information to the user. In some cases, a touch screen may be an input device, such as a keyboard, including is alphanumeric and other keys. The input device may be coupled to the bus and may communicate information and command selections to the processor. The input device may include various types of sensors (e.g., touch sensor unit 161 and 162) and may include a plurality of touch zones in the display unit 110 and 210 for detecting user input. The input device may further include a cursor control, such as a mouse, a trackball, or cursor direction keys, for communicating direction information and command selections to the processor and for controlling cursor movement on the display unit 110 and 210.

According to various exemplary embodiments of the invention, execution of the instructions contained in memory unit may cause the processor to perform processes according to the instructions. The control unit 180 and 240 may include one or more processors in a multi-processing arrangement to execute the instructions contained in memory unit. Hard-wired circuitry may be used in place of, or in combination with, software instructions to implement one or more of the exemplary embodiments of the present invention. For example, reconfigurable hardware, such as Field Programmable Gate Arrays (FPGAs), can be used, and functionality and connection topology of the FPGA logic gates may be customized at run-time, typically by programming memory look up tables. Thus, exemplary embodiments of the present invention are not limited to any specific combination of hardware circuitry and/or software.

The electronic device may also include at least one communication interface unit (e.g., signal transmission/reception unit 170 and 230). The communication interface unit may provide a two-way data communication coupling to a network link (not shown). The communication interface unit may send and receive electrical, electromagnetic, or optical signals that can carry digital data streams representing various types of information. Further, the communication interface unit may include peripheral interface devices, such as a Universal Serial Bus (USB) interface, or a PCMCIA (Personal Computer Memory Card International Association) interface.

The processor may execute transmitted code and/or may store the transmitted code in the memory unit, or in other non-volatile storage. In some cases, the electronic device may obtain application code in the form of a carrier wave.

A "computer-readable medium" may refer to any medium that provides instructions to the processor for execution. Such a medium may be implemented in various forms, including but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including the wires that comprise the bus. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other suitable magnetic medium, a compact disk read-only memory (CD-ROM), compact disc rewritable (CDRW), digital video disc (DVD), any other suitable optical medium, punch cards, optical mark sheets, any other suitable physical medium with patterns of holes or other optically recognizable indicia, a random-access memory (RAM), a programmable read-only memory (PROM), and erasable programmable read-only memory (EPROM), a FLASH-EPROM, any other memory chip or cartridge, and a carrier wave.

Various forms of computer-readable media may be involved in providing instructions to a processor for execution. For example, the instructions for carrying out at least part of the present invention may be implemented on a magnetic disk of a remote mobile terminal. The remote mobile terminal may load the instructions into the memory unit and may send the instructions, for example, over a telephone line using a modem. A modem of a local system may receive the data on a telephone line and/or may be used an infrared transmitter to convert the data to an infrared signal and may transmit the infrared signal to the electronic device. The electronic device may receive information and instructions provided by the infrared signal. The bus may provide the information and instructions to the memory unit, from which a processor may retrieve and execute the instructions. The instructions received by memory unit may optionally be stored either before or after execution by the control unit 180 and 240.

Referring to FIG. 3, FIG. 4, FIG. 5A, FIG. 5B and FIG. 5C are exemplary views of operation of the mobile terminal having a detachable sub-display unit of FIG. 1.

Figure 3:
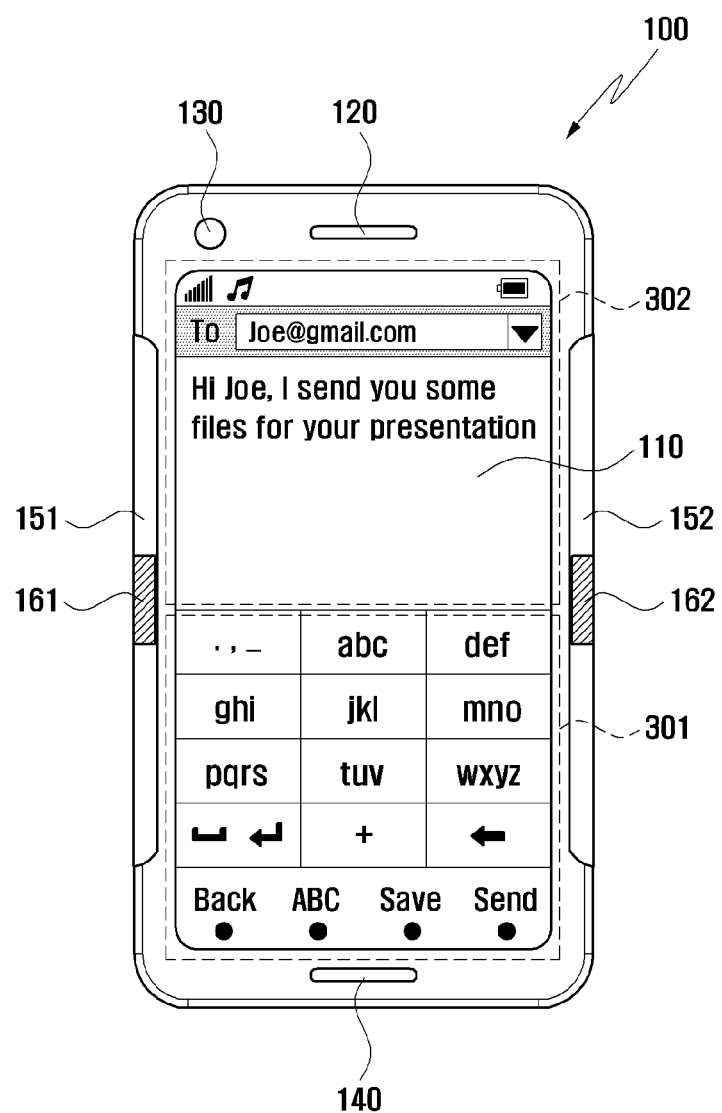
FIG. 3 shows an exemplary view of a first body unit of the mobile terminal having a detachable sub-display unit of FIG. 1.

For example, FIG. 3 shows an exemplary view of using only the first body unit 100 of the mobile terminal having a detachable sub-display unit of FIG. 1. In some examples, the user may use only the first body unit 100 of the mobile terminal. The user may set the mobile terminal to use only the first body unit 100 via the first display unit 110. In this example, the first control unit 180 may control to display a desired operation screen via only the first display unit 110.

FIG. 3 shows an exemplary view of a first body unit of the mobile terminal having a detachable sub-display unit of FIG. 1. As shown in FIG. 3, an example of an e-mail content using the first display unit 110 of the first body unit 100. In this example, the first control unit 180 may control the screen display of the first display unit 110 to display the contents to an input window 302 and to an upper portion of the screen of the first display unit 110, and to display a touch key pad 301 on a lower portion of the screen of the first display unit 110 to is enable the user to input characters to generate content. In some examples, the user may input and send a mail content using the touch key pad 301 displayed of the first display unit 110.

It is noted that the user may perform a desired operation using only the first display unit 110 of the first body unit 100, therefore, the user may choose to carry only the first body unit 100 when a screen expansion by the second display unit 210 is not needed for enhancing a mobility of the mobile terminal.

The user may set the mobile terminal to operate the first body unit 100 and second body unit 200 together via the first display unit 110 when the user needs not to operate a screen expanded by the second display unit 210. The first control unit 180 may control the screen display of the first display unit 110 and may transmit a control signal to the second control unit 240 to control the screen display of the second display unit 210. The second control unit 240 may receive the control signal from the first control unit 180 to control the screen display of the second display unit 210. It is contemplated that several scenarios may be possible as exemplary embodiments in which one approach involves using the first body unit 100 and second body unit 200 together and another approach in which the first body unit 100 and second body unit 200 may be utilized in a separate component and the other approach involves using the first body unit 100 and second body unit 200 in a coupled state.

Figure 4:
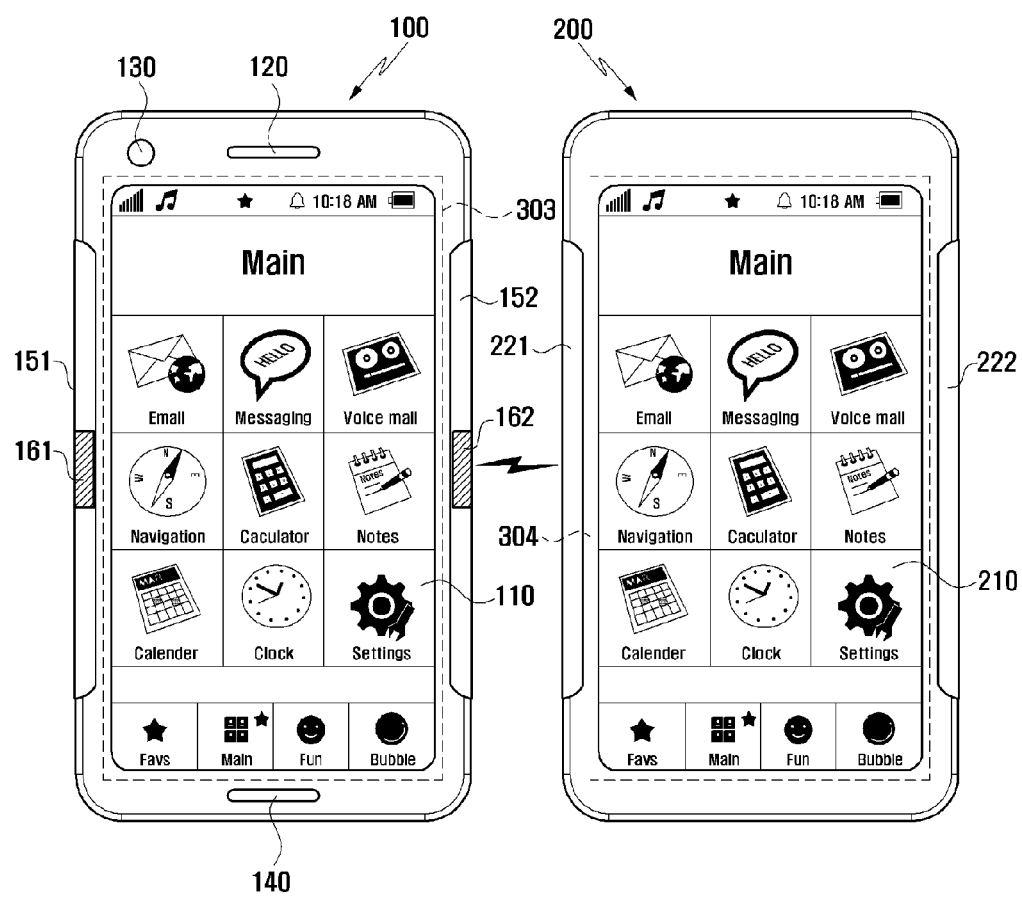
FIG. 4 shows an exemplary view of a first body unit and a second body unit in a separate state capable of supporting a detachable sub-display unit of FIG. 1.

FIG. 4 shows an exemplary view of a first body unit 100 and a second body unit 200 in a separated state capable of supporting a detachable sub-display unit of FIG. 1.

As shown in FIG. 4, when the user operates the first body unit 100 and second body unit 200 in a separate state, the first control unit 180 and second control unit 240 may control to output an identical screen image to the first display unit 110 and the second display unit 210. The above described approach provides an advantage that when two users have a meeting, a first user has the first body unit 100 and a second user has the second body unit 200, and the two users can view identical screen images 303 and 304 displayed on the first display unit 110 and second display unit 210, respectively, during the meeting.

In this example, when the first user having the first body unit 100 inputs a specific command via the first display unit 110, the first control unit 180 may display a screen image to the first display unit 110 according to a user command and may transmit a corresponding control signal to the second control unit 240. The second control unit 240 may receive the control signal and may control the second display unit 210 to display the same screen image as that of the first display unit 110, thereby enabling the second user having the second body unit 200 to view the same screen image of the first user.

Similarly, when the second user having the second body unit 200 inputs a command through the second display unit 210, the second control unit 240 may display a screen image on the second display unit 210 according to the command by the second user and may transmit a corresponding control signal to the first control unit 180. The first control unit 180 may receive the control signal and may control the first display unit 110 to display the same screen image as that of the second display unit 210.

Although FIG. 4 shows an example in which an identical screen image can be displayed on the first display unit 110 and second display unit 210, the first display unit 110 may be applied to display a screen image different to the screen image displayed on the second display unit 210.

Figure 5A:
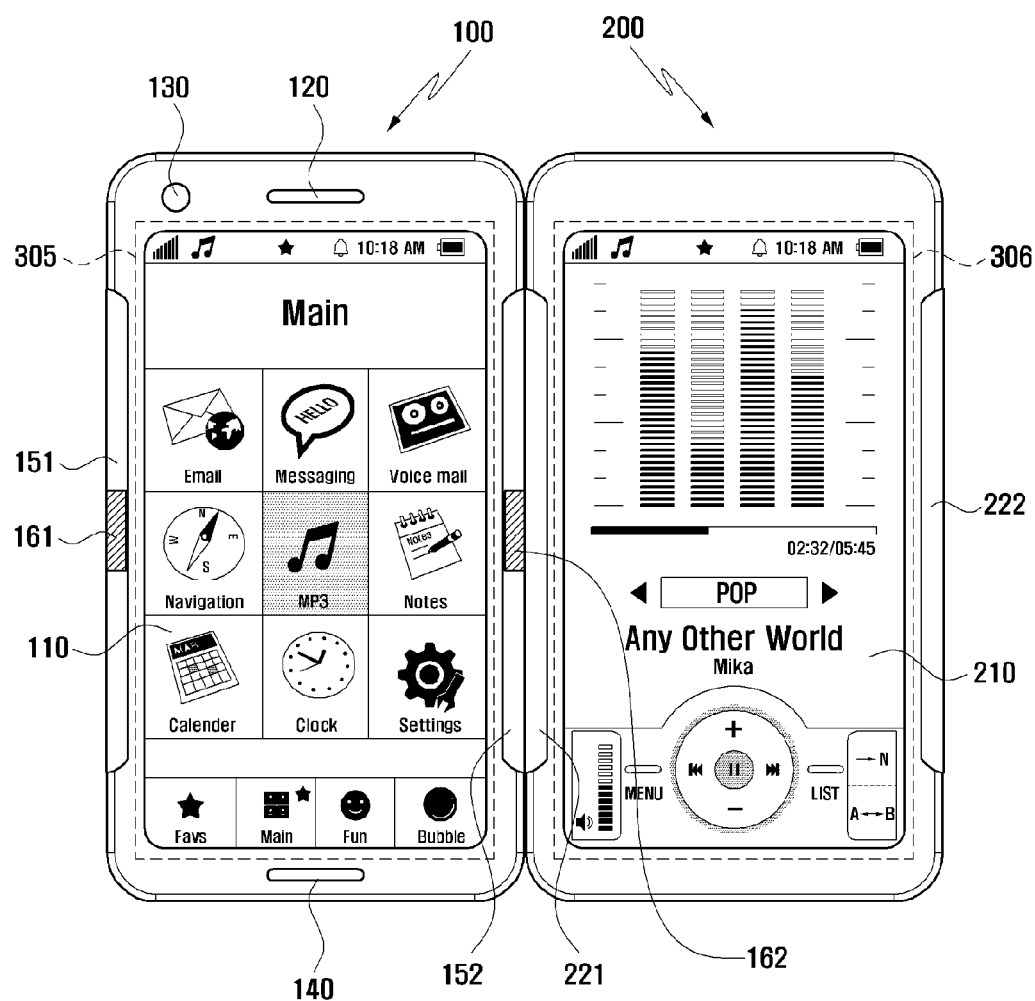
FIG. 5A, FIG. 5B and FIG. 5C are exemplary views showing a first body unit and a second body unit used in a coupled state capable of supporting a detachable sub-display unit of FIG. 1.
Figure 5B:
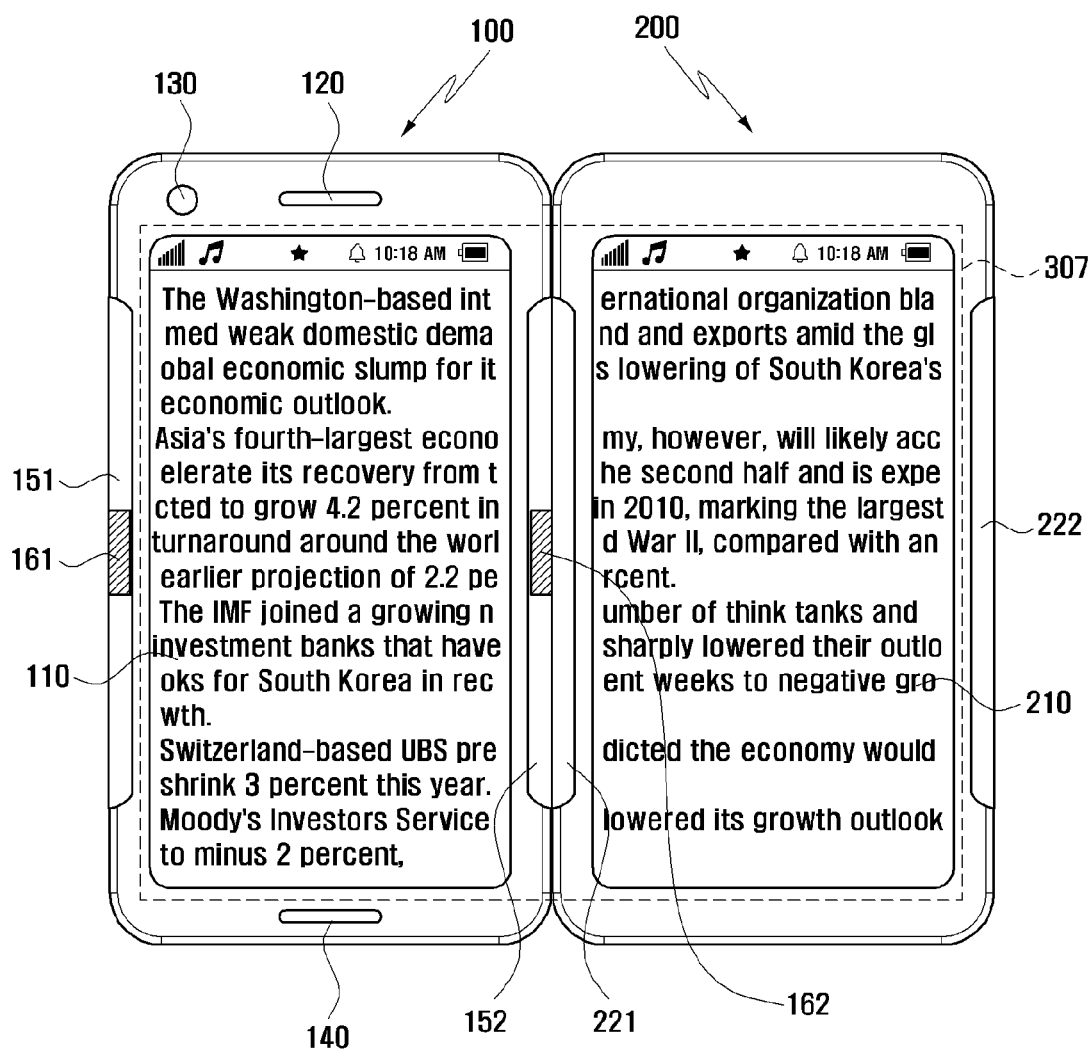
Figure 5C:
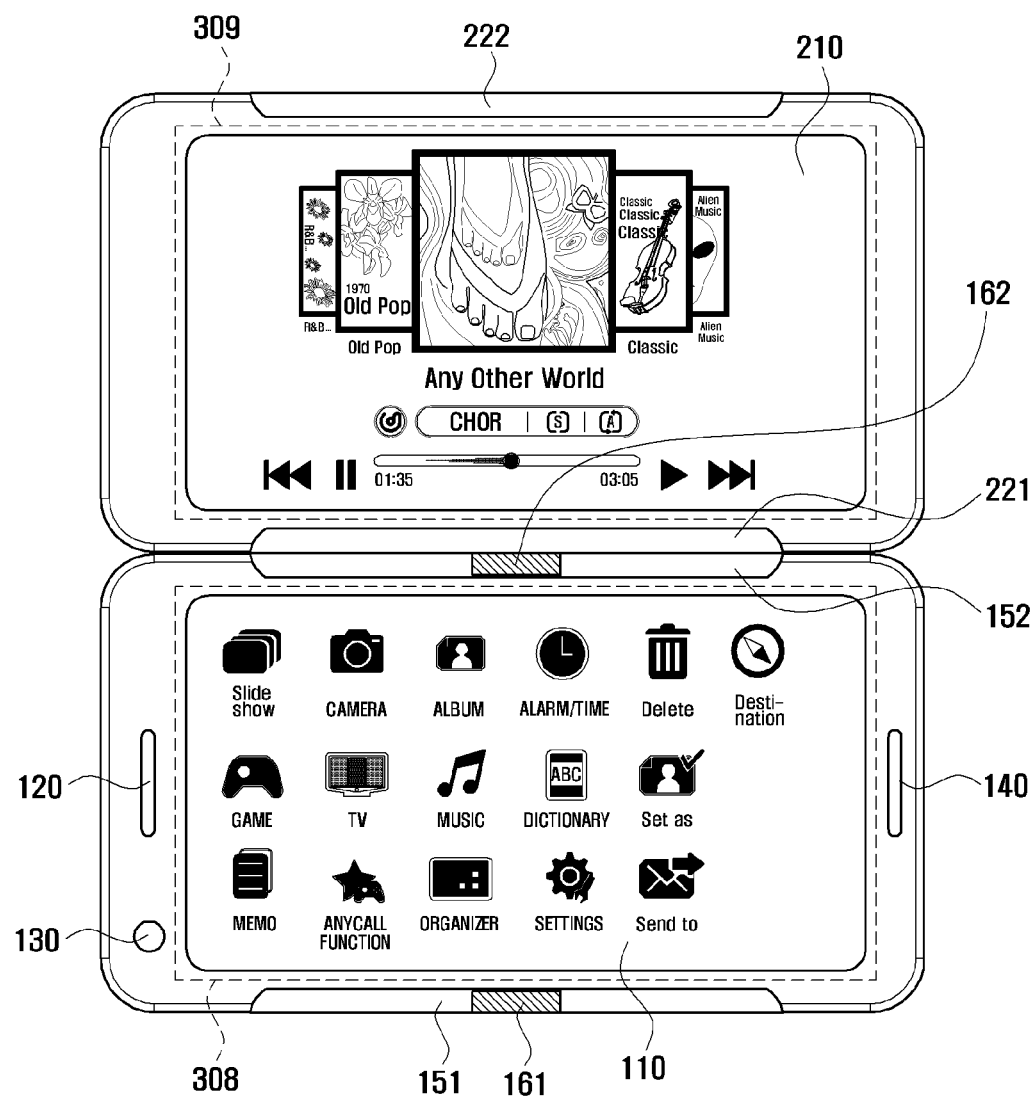

FIG. 5A, FIG. 5B and FIG. 5C are exemplary views showing a first body unit and a second body unit in a coupled state capable of supporting a detachable sub-display unit of FIG. 1.

In some examples, as shown in FIG. 5A, the first body unit 100 and second body unit 200 may be coupled using magnets 151 and 152 that can be formed on each side surfaces of the first body unit 100, and magnets 221 and 222 may be installed on each side surfaces of the second body unit 200, as shown in FIG. 1. When the second body unit 200 is coupled to the first body unit 100, the front surface of the second display unit 210 may be coupled in parallel with the front surface of the first display unit 110.

FIG. 5A shows a menu screen 305 displayed on the first display unit 110, and a screen 306 displayed on the second display unit 210 that correspond to a function selected from the menu screen 305. For example, when the user selects an MP3 replay function from the menu screen 305 displayed on the first display unit 110, the second display unit 210 may display the screen 306 according to the user selection of replaying an MP3 file. In this example, the first control unit 180 controls the first display unit 110 to display the menu screen 305, and while the user inputs a command through the menu screen 305, the second control unit 240 may control the second display unit 210 to display the screen 306 according to the input command transmitted by the first control unit 180. If the user selects a specific menu option via the first display unit 110, the first control unit 180 may transmit a control signal corresponding to a function selected by the user to the second control unit 240. The second control unit 240 may receive the control signal and may control the second display unit 210 to display the screen 306 corresponding to the selected function.

FIG. 5B shows an exemplary view of an expanded screen 307 in which screens of the first display unit 110 and second display unit 210 can be coupled when the user wants to view contents in a wide screen, for example, contents for Internet web browsing.

The first control unit 180 can determine whether the second body unit 200 is is coupled to the first body unit 100 in response to detection of the sensor units 161 and 162, and can control to expand a display screen of the first display unit 110 to allow display contents typically requiring a large screen such as contents for an Internet web page, to an expanded display screen including the first display unit 110 and second display unit 210 for displaying the screen 307. In FIG. 5B, the first control unit 180 can split a display screen image of the first display unit 110 into two split (e.g., divided) image, for example, a left split screen image and a right split screen image along a vertical axis of the first control unit 180, and can display the left split screen image on the first display unit 110. The first control unit 180 can transmit a control signal to the second control unit 240 to display the right split screen image on the second display unit 210. The second control unit 240 can receive the control signal and can control the second display unit 210 to display the right split screen. Accordingly, the user can display split images to the expanded screen 307 as a whole or can display each of split images to the respective sections of the expanded screen 307 by coupling the first display unit 110 and second display unit 210.

FIG. 5C shows an exemplary menu screen 308 on the first display unit 110, and a screen 309 on the second display unit 210 capable of operating a music replay function selected from the menu screen.

As shown in FIG. 5C, the function is similar to the functional operation of FIG. 5A except that the first control unit 180 and second control unit 240 can display contents in landscape mode—e.g., image screens on the first display unit 110 and second display unit 210 respectively.

The user may expand the screen of the first display unit 110 to the second display unit 210 by coupling the first body unit 100 and second body unit 200, thereby enabling the user to easily adjust a size of a display area according to applications.

Figure 6:
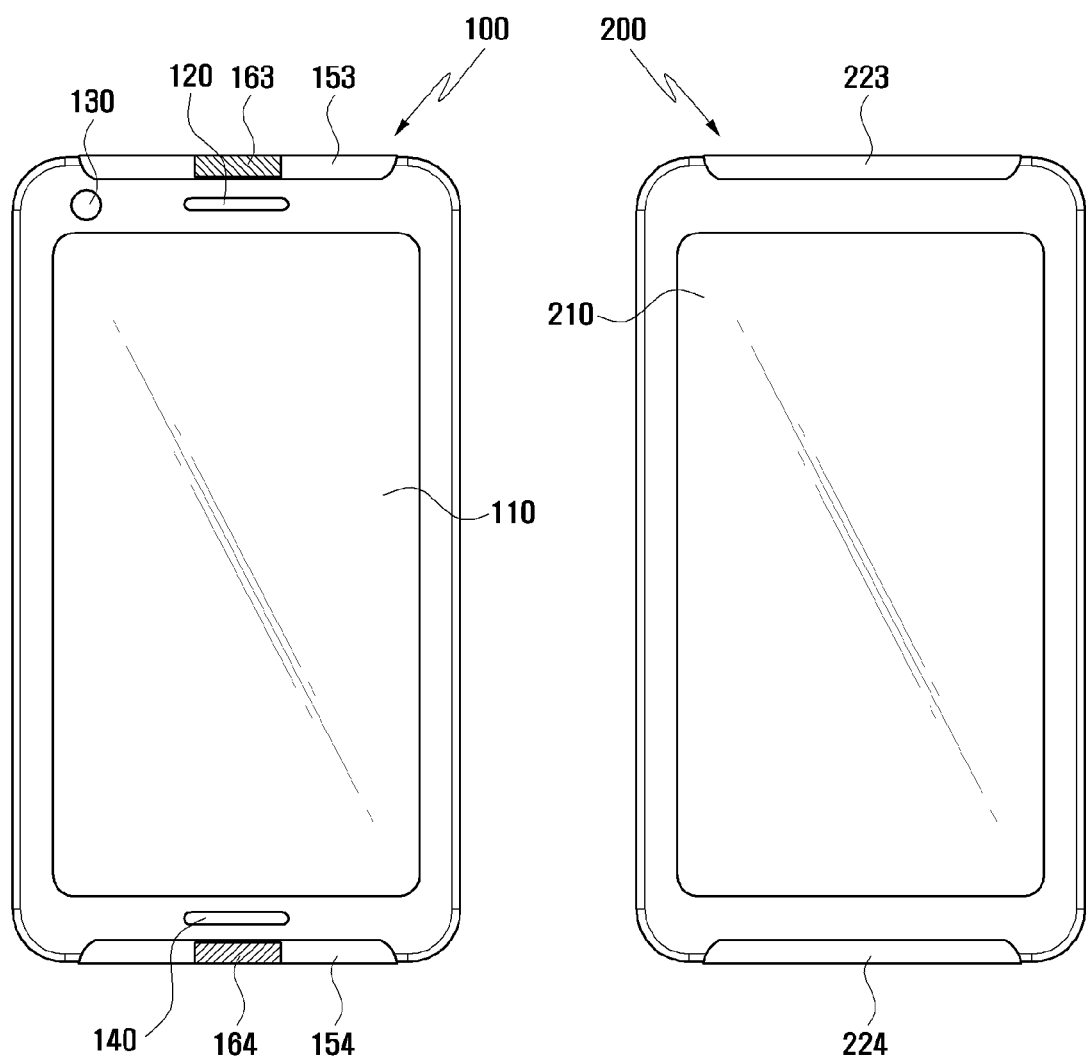
FIG. 6 is an exemplary view of a mobile terminal having a detachable sub-display unit, according to exemplary embodiments of the present invention.
Figure 7A:
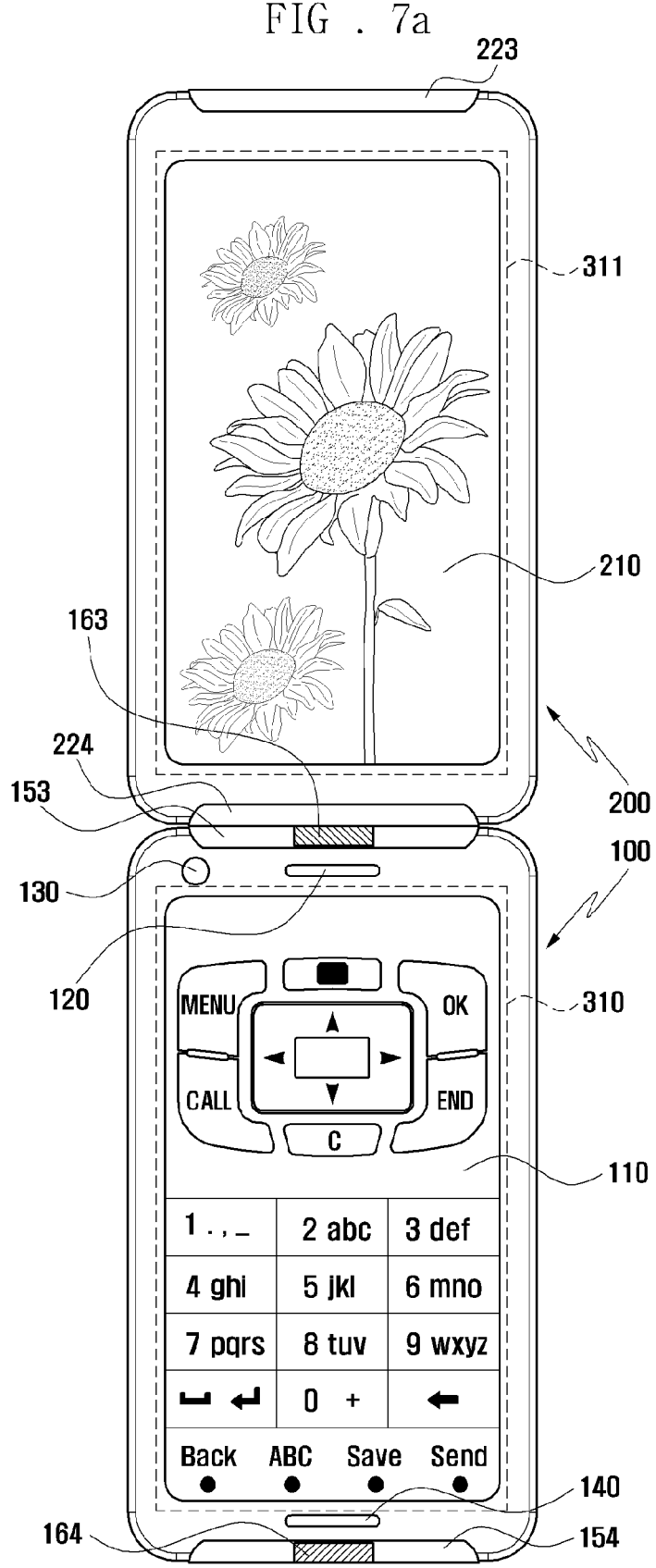
FIG. 7A and FIG. 7B are exemplary views showing a first body unit and a second body unit used in a coupled state capable of supporting a detachable sub-display unit of FIG. 6.
Figure 7B:
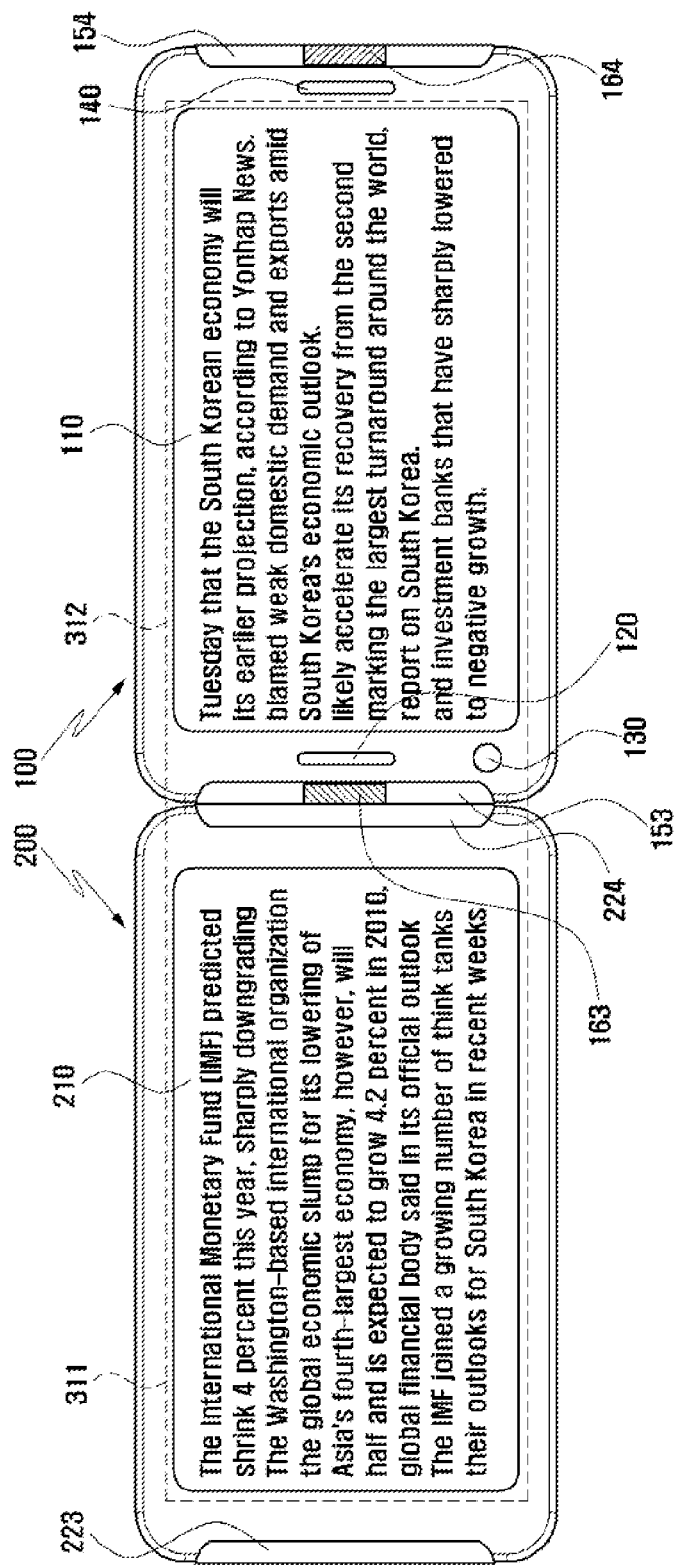

FIG. 6 is an exemplary view of a mobile terminal having a detachable sub-display unit, according to exemplary embodiments of the present invention, and FIG. 7A, FIGS. 7B and 7B show examples of using a first body unit and second body unit in a coupled state capable of supporting a detachable sub-display unit of the mobile terminal.

In the mobile terminal shown in FIG. 6, magnets 163 and 164 can be installed at an upper end portion and lower end portion of the first body unit 100, and magnets 223 and 224 can be installed at an upper end portion and lower end portion of the second body unit 200 by way of configuration and this configuration includes distinctive features differently from that of the configuration of the mobile terminal of FIG. 1. For example, sensor units 153 and 154 can be installed on the magnets 163 and 164, respectively, at the upper end portion and lower end portion of the first body unit 100. When the magnets 163, 164, 223, and 224 are installed at the upper ends portions and lower ends portions of the first body unit 100 and second body unit 200, as shown in FIG. 6, the first body unit 100 and second body unit 200 may be coupled in a vertical direction of the mobile terminal.

FIG. 7A shows an exemplary touch key pad 310 including numerals, characters and symbols formed on the first display unit 110, and a screen 311 including various information such as a menu, an image, and a moving image on the second display unit 210. The mobile terminal in which the first body unit 100 and second body unit 200 are coupled by way of configuration of the mobile terminal as exemplarily shown in FIG. 7A may be a folder type mobile terminal. FIG. 7B shows an example of displaying an expanded screen 312 in which a screen of the first display unit 110 can be expanded to the second display unit 210 when the user wants to view contents in a wide screen, for example, contents for Internet web browsing.

It is apparent, however, to one skilled in the art that the present invention may be practiced operations of the first control unit 180 and second control unit 240 in the examples of FIGS. 7A and 7B that is similar to that of the previous exemplary embodiment without these specific details or with an equivalent arrangement. In other instances, well-known structures and devices are shown in block diagram form in order to avoid unnecessarily obscuring the present invention.

A structure of a mobile terminal having a detachable sub-display unit according to exemplary embodiments of the present invention provides simplified configuration in expanding display unit compared to a conventional mobile terminal having a coupling structure by implementing a mechanical connection method The approach embodied in exemplary embodiments of the present invention makes a user to perform an operation using only the first display unit of the first body unit when a mobile terminal having a detachable sub-display unit, the user may choose to carry only the first body unit when a screen expansion is needed by coupling the first display unit to the second display, thereby enhancing mobility of the mobile terminal.

A size of a display area of the mobile terminal of the present invention may be easily adjusted corresponding to applications in which the user may expand a screen of the first display unit to the second display unit by coupling the first body unit and second body unit when it is required.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
a first body unit comprising a first control unit and a first display unit formed to a portion of the first body unit; and
a second body unit comprising a second control unit and a second display unit formed to a portion of the second body unit,
wherein a magnet is formed to a portion of side surface of the first body unit or a portion of side surface of the second body unit, wherein the second body unit is detachably coupled to the first body unit,
wherein, if one of the first display unit and the second display unit are detected to receive an input command, one of the first control unit and the second control unit is configured to control the first display unit, the second display unit, or both the first display unit and the second display unit, and
wherein control of the display units comprises at least one of controlling to display an identical screen image on the first display unit and the second display unit, controlling to display a menu screen on the first display unit and to display an executable function corresponding to a menu selected from the menu screen on the second display unit, and controlling to expand a display screen of the first display unit to display contents on the second display unit.

2. The mobile terminal of claim 1, further comprising:
a surface of the second display unit is coupled in parallel with a surface of the first display unit.

3. The mobile terminal of claim 1, wherein the first body unit comprises a sensor unit to detect whether the second body unit is coupled to the first body unit.

4. The mobile terminal of claim 1, wherein the first control unit is configured to control a screen display of the first display unit, and the second control unit is configured to control a screen display of the second display unit, and wherein the first control unit is configured to transmit and to receive a control signal to and from the second control unit, in response to detection of an operation command to the second body unit to control the first display unit and the second display unit.

5. The mobile terminal of claim 4, wherein the first body unit comprises a first signal transmission/reception unit, the second body unit comprises a second signal transmission/reception unit, and wherein the first signal transmission/reception unit is configured to transmit and to receive the control signal to and from the second signal transmission/reception unit via wireless communication.

6. The mobile terminal of claim 4, wherein the first control unit is configured to control the menu screen of the first display unit, and the second control unit is configured to control to display a screen image of the second display unit in response to detection of a user input on the menu screen detected from the first control unit, the screen image comprising an executable function corresponding to the selected menu screen.

7. The mobile terminal of claim 4, wherein the first control unit and the second control unit are configured to control display of at least one of a whole screen, a screen in part, or an identical screen of the first display unit and the second display unit.

8. The mobile terminal of claim 4, wherein, in response to detection of the second body unit that is coupled to the first body unit, the first control unit and the second control unit are configured to control to expand a display screen of the first display unit to a display screen of the second display unit.

9. The mobile terminal of claim 1, wherein the first display unit and the second display unit comprises an LCD (liquid crystal display) device and an OLED (organic light emitting diode) device.

10. The mobile terminal of claim 1, wherein the first display unit and the second display unit comprise a touch screen comprising executable functions.

11. The mobile terminal of claim 1, wherein the first body unit and the second body unit comprise a key input unit to receive a command input.

12. A method, comprising:
receiving an input command from one of a first display and a second display, the first display comprising a first control unit and the second display comprising a second control unit, wherein the first display and the second display are detachably coupled using a magnet; and
controlling the first display, the second display, or both the first display and the second display associated with one of the first control unit and the second control unit,
wherein controlling the displays comprises at least one of controlling to display an identical screen image on the first display and the second display, controlling to display a menu screen on the first display and to display an executable function corresponding to a menu selected from the menu screen on the second display, and controlling to expand a display screen of the first display to display contents on the second display.

13. The method of claim 12, wherein the first display comprises a first signal transmission/reception unit, the second display comprises a second signal transmission/reception unit, wherein the first signal transmission/reception unit is configured to transmit and to receive the control signal to and from the second signal transmission/reception unit via wireless communication.

14. The method of claim 12, wherein the first control unit is configured to control the menu screen of the first display, and the second control unit is configured to control to display a screen image of the second display in response to detection of a user input on the menu screen detected from the first control unit, the screen image comprising an executable function corresponding to the selected menu screen.

15. The method of claim 12, wherein the first control unit and the second control unit are configured to control display of at least one of a whole screen, a screen in part, or an identical screen of the first display and the second display.

16. The method of claim 12, wherein the first display and the second display comprise a touch screen comprising executable functions.

17. The method of claim 12, wherein the first display and the second display comprise a key input unit to receive a command input.

18. The method of claim 12, wherein the first display comprises a sensor unit to detect whether the second display is coupled to the first display.

* * * * *